(12) United States Patent
Epstein et al.

(10) Patent No.: US 10,837,622 B2
(45) Date of Patent: Nov. 17, 2020

(54) COLLIMATING STEP-WEDGE LIGHT GUIDE

(71) Applicant: 3M INNOVATIVE PROPERTIES COMPANY, St. Paul, MN (US)

(72) Inventors: Kenneth A. Epstein, St. Paul, MN (US); John A. Wheatley, Lake Elmo, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 207 days.

(21) Appl. No.: 15/755,198

(22) PCT Filed: Aug. 25, 2016

(86) PCT No.: PCT/US2016/048537
§ 371 (c)(1),
(2) Date: Feb. 26, 2018

(87) PCT Pub. No.: WO2017/035298
PCT Pub. Date: Mar. 2, 2017

(65) Prior Publication Data
US 2018/0246266 A1 Aug. 30, 2018

Related U.S. Application Data

(60) Provisional application No. 62/210,181, filed on Aug. 26, 2015.

(51) Int. Cl.
*F21V 13/02* (2006.01)
*F21V 14/00* (2018.01)
(Continued)

(52) U.S. Cl.
CPC ............... *F21V 13/02* (2013.01); *F21V 9/40* (2018.02); *F21V 14/00* (2013.01); *G02B 6/002* (2013.01);
(Continued)

(58) Field of Classification Search
CPC .... G02B 6/002; G02B 6/0036; G02B 6/0038; G02B 6/0048; F21V 14/00; F21V 13/02
See application file for complete search history.

(56) References Cited

U.S. PATENT DOCUMENTS

| 6,845,212 B2 | 1/2005 | Gardiner |
| 7,046,905 B1 | 5/2006 | Gardiner |

(Continued)

FOREIGN PATENT DOCUMENTS

KR    2007-0079400    8/2007

OTHER PUBLICATIONS

International Search report for PCT International Application No. PCT/US2016/048537 dated Nov. 10, 2016, 4 pages.

*Primary Examiner* — Thomas M Sember
(74) *Attorney, Agent, or Firm* — Lisa P. Fulton (57) ABSTRACT

A light guide includes a light input surface, a first major surface orthogonal to the light input surface and a second major surface opposing the first major surface and forming a converging wedge with the first major surface. The second surface includes a plurality of doublet light extraction features closely-packed or separated by a land feature. Each doublet feature includes a first prism feature having a first shape and a second prism feature having a second shape and the second shape is different than the first shape.

23 Claims, 10 Drawing Sheets

(51) Int. Cl.
   *F21V 8/00*      (2006.01)
   *F21V 9/40*      (2018.01)
   *F21V 7/00*      (2006.01)
   *F21Y 103/33*    (2016.01)

(52) U.S. Cl.
   CPC ......... *G02B 6/0036* (2013.01); *G02B 6/0038* (2013.01); *G02B 6/0048* (2013.01); *F21V 7/0091* (2013.01); *F21Y 2103/33* (2016.08); *G02B 6/0078* (2013.01)

(56) References Cited

U.S. PATENT DOCUMENTS

| | | |
|---|---|---|
| 7,221,847 B2 | 5/2007 | Gardiner |
| 7,587,117 B2 | 9/2009 | Winston |
| 7,873,256 B2 | 1/2011 | Gardiner |
| 8,434,913 B2 | 5/2013 | Vissenberg |
| 8,469,575 B2 | 6/2013 | Weber |
| 8,588,574 B2 | 11/2013 | Gardiner |
| 8,807,816 B2 | 8/2014 | Desmet |
| 8,956,035 B2 | 2/2015 | Pan |
| 9,599,766 B2 | 3/2017 | Ouderkirk |
| 9,778,407 B2 | 10/2017 | Nevitt |
| 2003/0034445 A1 | 2/2003 | Boyd |
| 2003/0112521 A1 | 6/2003 | Gardiner |
| 2006/0291253 A1* | 12/2006 | Kim ................ G02B 6/0038 362/620 |
| 2007/0279727 A1 | 12/2007 | Gandhi |
| 2008/0259634 A1 | 10/2008 | Mi |
| 2011/0187942 A1* | 8/2011 | Cho ................ G02B 6/002 348/739 |
| 2013/0286653 A1 | 10/2013 | Holman |
| 2014/0268872 A1 | 9/2014 | Holman |
| 2016/0048343 A1 | 2/2016 | Pekny |

* cited by examiner

COLLIMATING STEP-WEDGE LIGHT GUIDE

BACKGROUND

Spot luminaires are typically powered by an LED or an assembly of LEDs and concentrated into a collimated beam with a low cost spun aluminum reflector. Spot luminaires provide bright low-glare lighting; however, the reflector profile becomes deeper and less efficient as the focused beam narrows.

There is interest in adapting LCD backlight technology to illumination. A slab light guide is reasonably efficient in the backlight of an edgelit TV. However, these backlights are designed for wide view displays, and they emit at high angles unsuited to low-glare specifications. A lenticular light guide is a collimated source, but the functional luminaire requires a turning film and a specular reflector in addition to the light guide.

SUMMARY

The present disclosure relates to a collimating step-wedge light guide. This light guide can be utilized to form a low glare, highly efficient spot luminaire, for example.

In one aspect, light guide includes a light input surface, a first major surface orthogonal to the light input surface and a second major surface opposing the first major surface and forming a converging wedge with the first major surface. The second surface includes a plurality of doublet light extraction features closely-packed or separated by a land feature. Each doublet feature includes a first prism feature having a first shape and a second prism feature having a second shape and the second shape is different than the first shape.

These and various other features and advantages will be apparent from a reading of the following detailed description.

BRIEF DESCRIPTION OF THE DRAWINGS

The disclosure may be more completely understood in consideration of the following detailed description of various embodiments of the disclosure in connection with the accompanying drawings, in which.

DETAILED DESCRIPTION

In the following detailed description, reference is made to the accompanying drawings that form a part hereof, and in which are shown by way of illustration several specific embodiments. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties desired by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising," and the like.

The present disclosure relates to a collimating step-wedge light guide. In particular this step-wedge light guide includes a light extraction surface that includes a plurality of doublet light extraction features closely-packed or separated by a land feature. Each doublet feature includes a first prism feature having a first shape and a second prism feature having a second shape and the second shape is different than the first shape. The second prism feature recovers light that transmits out of the first prism feature and directs it out of the light emission surface of the light guide. This step-wedge light guide can be thin (1 to 10 mm or 3 to 10 mm thick for example), efficient (greater than 90% or 95% for example), and provide a narrow beam of emitted light (less than 30 degrees FWHM or less than 20 degrees FWHM, for example). While the present disclosure is not so limited, an appreciation of various aspects of the disclosure will be gained through a discussion of the examples provided below.

Figure 1:
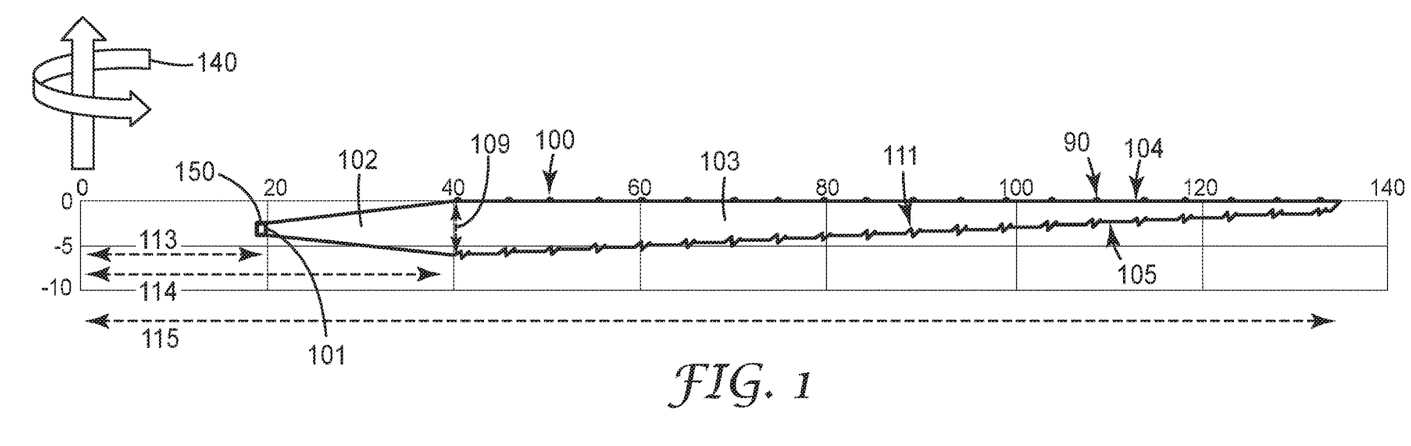
FIG. 1 is a cross-sectional schematic diagram of an illustrative step-wedge light guide with land separating doublet light extraction features.
Figure 2:
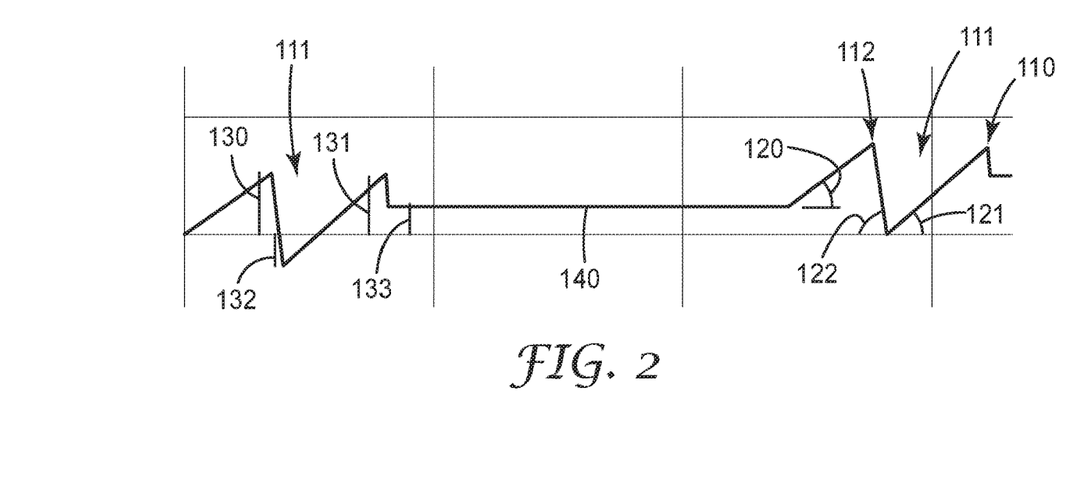
FIG. 2 is a cross-sectional schematic diagram of the doublet light extraction features illustrated in FIG. 1.

FIG. 1 is a cross-sectional schematic diagram of an illustrative step-wedge light guide 100 with land 140 separating doublet light extraction features 111. FIG. 2 is a cross-sectional schematic diagram of the doublet light extraction features 111 illustrated in FIG. 1.

The light guide 100 includes a light input surface 101, a first major surface 104 orthogonal to the light input surface 101 and a second major surface 105 opposing the first major surface 104 and forming a converging wedge 103 with the first major surface 104. The second major surface 105 includes a plurality of doublet light extraction features 111 separated by a land feature 140. In some embodiments, the doublet light extraction features 111 are closely-packed and do not include a land feature (described below). Each doublet feature 111 includes a first prism feature 112 having a first shape and a second prism 110 feature having a second shape and the second shape is different than the first shape. The second prism feature 110 recovers light that transmits out of the first prism feature 112 and directs it out of the light emission surface 104 of the light guide 100. Examples 1-8 are circular light guides having a step wedge shape configured according to FIG. 6 with the model parameters according to Table 1A and 1B.

In many embodiments, the land feature 140 is parallel with the first major surface 104. In some embodiments the land feature 140 has a constant length between adjacent doublet feature 111 and along the length of the second major surface 105. In other embodiments the land feature 140 has a constant length that changes or decreases or increases between adjacent doublet feature 111 and along the length of the second major surface 105.

Figure 6:
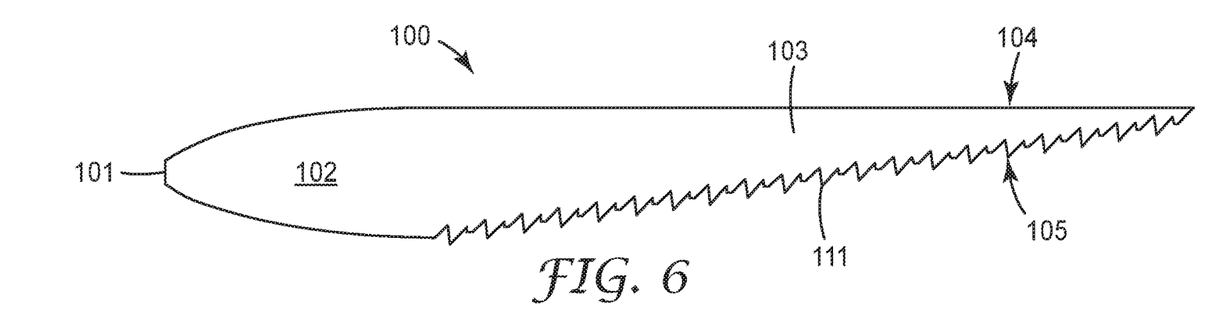
FIG. 6 is a cross-sectional schematic diagram of an illustrative step-wedge light guide with closely-packed doublet light extraction features and a parabolic collimating diverging wedge.

The light guide 100 can include a light collimating element 102 that collimates the light entering the light input surface 101. In many embodiments the light collimating element 102 is a diverging wedge element as illustrated in FIG. 1. In other embodiments the light collimating element 102 is a diverging parabolic element as illustrated in FIG. 6. The light collimating element 102 is between the light input surface 101 and the second major surface 104. The light collimating element 102 can extend from an inner radius 113 to a wedge radius 114. The light guide 100 has maximum thickness 109 at the wedge radius 114.

In many embodiments Lambertian light is transmitting into the light input surface 101 and this Lambertian light is collimated by the light collimating element 102. A solid state light source such as a light emitting diode 150 (or VCSEL, OLED and the like) can direct the Lambertian light into the light input surface 101. The light emitting diode 150 can be adjacent to the light input surface 101. The solid state light source can be separated from the light input surface 101 by an air gap or other low refractive index medium. When two or more solid state light sources are utilized in the light guide construction, each solid state light source can be independently controlled to tailor the light emission out of the light guide. Difference colors or spectral output can be tailored by controlling the individual solid state light sources and/or steering element portion directing the emitted light.

The light guide 100 profile can be rotated about the center axis 140 to form a circular or semi-circular solid body light guide 100. Thus the doublet light extraction features 111 form at least a portion of a circle having an inner radius 113 and an outer radius 115 and the light input surface 101 is located at the inner radius 113 and the plurality of doublet light extraction features 111 separated by the land feature 140 are concentric about the center axis 140.

The light guide 100 and doublet light extraction features 111 can form a complete circle (annular solid body) or any portion of a circle for example, 45 degree arc, 90 degree arc, 180 degree arc or 270 degree arc. A plurality of light sources 150 can be adjacent to and along the inner radius 113 of the circle or arc light guide 100.

In some embodiments the doublet light extraction features 111 can spatially vary along the radius (and/or circumference) of the circular or semi-circular solid body light guide 100. In these embodiments emitted light can be selectively tailored according to which light sources 150 are illuminated about the inner radius 113 of the light guide 100 and thus which regions light is extracted out of the light guide 100. For example, a first arc portion of the light guide can direct light in a first direction and a second arc portion of the light guide can direct light in second direction that is different than the first direction. An additional light steering element (described below) can be adjacent to the light emission surface 104 to further tailor the light redirection or modification of light emitted from the light guide 100 or selected portions of the light guide 100. In some embodiments the doublet light extraction features can be on the second major surface for a first radius distance and then on the first major surface a second radius distance to emit light out of both surfaces of the light guide.

The circular or semi-circular solid body light guide 100 can be disposed on or within a polygon shaped tile element. In many embodiments, the polygon shaped tile element is a hexagon, square or rectangular tile element. A plurality of these tile elements can be assembled together to form an array of light guides 100.

In some embodiments, the first major surface 104 also optionally includes light extraction features 90 and directs light out of the second major surface 105. In these embodiments, a region of the light guide 100 selectively emits light out of the first surface 104 opposing light extraction features and also selectively emits light out of a second region of the light guide 100 second surface 105 opposing light extraction features.

In some embodiments the first major surface 104 is curved. The curve can be a linear or non-linear curve along a portion of the entire first major surface 104.

In many embodiments the light guide emits collimated light. For example, light emitted from the light guide has a full width half max (FWHM) of less than 40 degrees or less than 30 degrees or less than 20 degrees.

FIG. 2 is a cross-sectional schematic diagram of the doublet light extraction features 111 illustrated in FIG. 1. Each doublet feature 111 includes a first prism feature 112 having a first shape and a second prism 110 feature having a second shape and the second shape is different than the first shape.

The first prism feature 112 has a first extractor facet angle 120 with the land 140. This first extractor facet angle 120 can be from 30 degrees to 50 degrees or from 35 degrees to 45 degrees and a distal facet angle 122 can be from 35 degrees to 50 degrees or from 40 degrees to 50 degrees. The first prism feature 112 has a first extractor facet height 130 and a valley depth 132.

The second prism feature 110 has a second extractor facet angle 121 parallel with the land 140. This second extractor facet angle 121 can be from 35 degrees to 55 degrees or from 40 degrees to 50 degrees and a riser facet angle can be from 70 degrees to 90 degrees or from 80 degrees to 85 degrees. The second prism feature 110 has a second extractor facet height 131 and a step height 133. In many embodiments the ratio of first extractor facet height 130:second extractor facet height 131:valley depth 132:step height 133 are 2.14:2.0:-1.0:1.0 (130:131:132:133 respectively).

Figure 3:
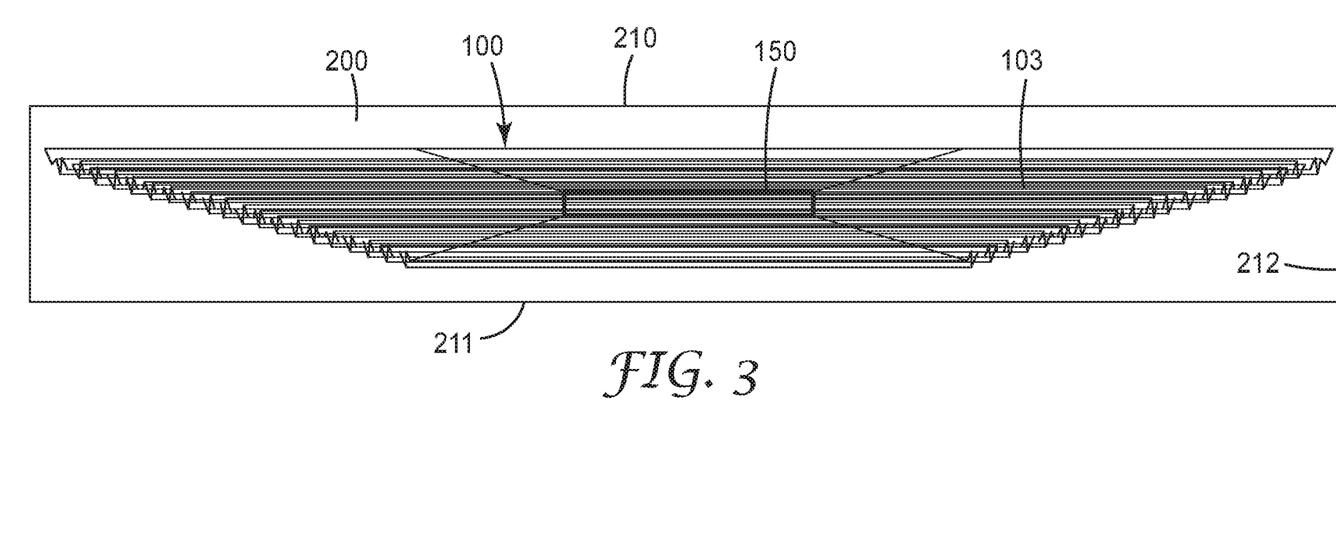
FIG. 3 is a side elevation schematic diagram view of a simulation model of the step-wedge light guide.

FIG. 3 is a side elevation schematic diagram view of a simulation model of the step-wedge light guide 100 utilized in the examples. FIG. 3 shows the light guide 100 housed in a thin hollow cylinder or can 200. The lid of the can functioned as a detector surface, essential only for the optical simulation. FIG. 3 shows the light guide 100 with the reflector/detector cylinder 200 having detector surface 210, which is modeled as 100% absorbing, and mirror surfaces 211 and 212, modeled as 95% reflective, the solid light guide 103, and the LED ring 150 with a plurality of LEDs.

Figure 4:
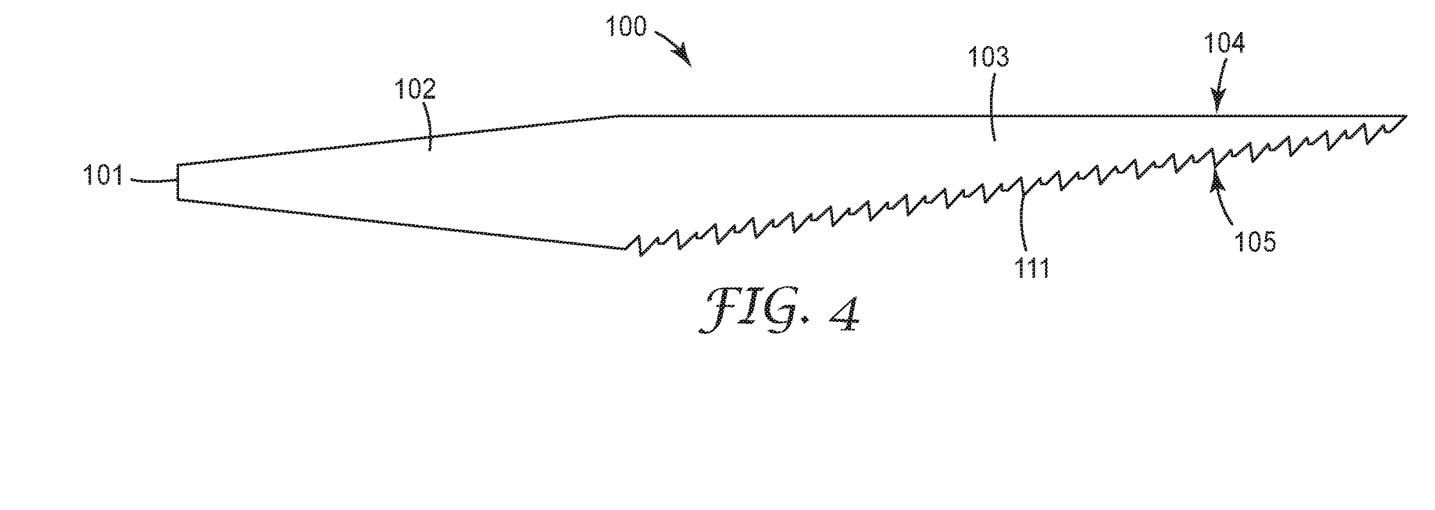
FIG. 4 is a cross-sectional schematic diagram of an illustrative step-wedge light guide with closely-packed doublet light extraction features.
Figure 5:
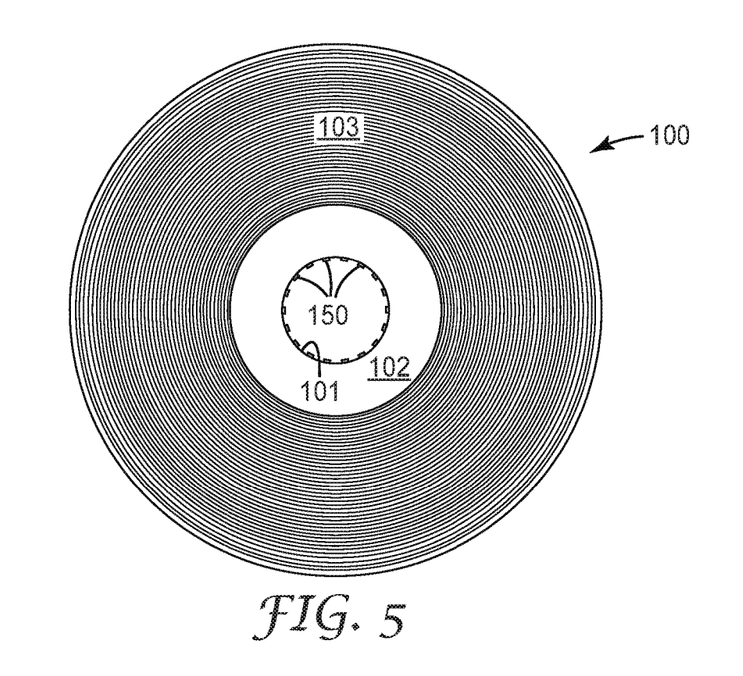
FIG. 5 is a top schematic diagram view of the illustrative step-wedge light guide of FIG. 4.

FIG. 4 is a cross-sectional schematic diagram of an illustrative step-wedge light guide 100 with closely-packed doublet light extraction features 111. FIG. 5 is a top schematic diagram view of the illustrative step-wedge light guide 100 of FIG. 4.

The light guide 100 includes a light input surface 101, a first major surface 104 orthogonal to the light input surface 101 and a second major surface 105 opposing the first major surface 104 and forming a converging wedge 103 with the first major surface 104. The second major surface 105 includes a plurality of closely-packed doublet light extraction features 111. In this embodiment there are no land features separating doublet light extraction features 111. Each doublet feature 111 includes a first prism feature 112 having a first shape and a second prism 110 feature having a second shape and the second shape is different than the first shape. The second prism feature 110 recovers light that transmits out of the first prism feature 112 and directs it out of the light emission surface 104 of the light guide 100. Refer to FIG. 2 regarding the specifics of the doublet light extraction features 111.

FIG. 5 is a top view of the illustrative step-wedge light guide 100 of FIG. 4 forming a circular or annular solid body light guide 100. The light input surface 101 forms the inner radius of the annular solid body light guide 100. A plurality of light sources 150, such as light emitting diodes, for example, are adjacent to the light input surface 101 forming the inner radius of the annular solid body light guide 100. The doublet light extraction features 111 are concentric with the inner radius and light input surface 101.

Figure 7:
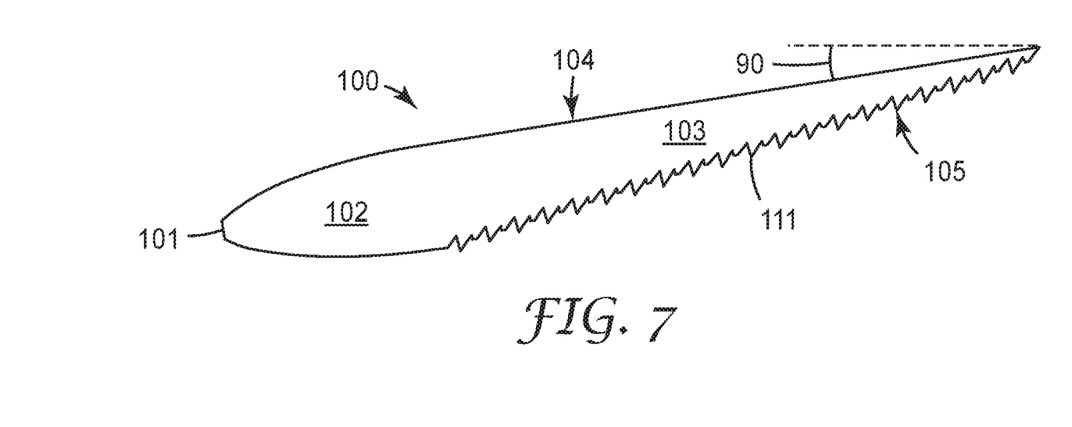
FIG. 7 is a cross-sectional schematic diagram of an illustrative step-wedge light guide of FIG. 6 having a conical tilt angle of 10 degrees.

FIG. 6 and FIG. 7 are cross-sectional schematic diagrams of an illustrative step-wedge light guide 100 with closely-packed doublet light extraction features 111 and a parabolic collimating diverging wedge 102. Example 9 is a circular light guide having a step wedge shape configured according to FIG. 6.

The light guide 100 includes a light input surface 101, a first major surface 104 orthogonal to the light input surface 101 and a second major surface 105 opposing the first major surface 104 and forming a converging wedge 103 with the first major surface 104. The second major surface 105 includes a plurality of closely-packed doublet light extraction features 111. In this embodiment there are no land features separating doublet light extraction features 111. Each doublet feature 111 includes a first prism feature 112 having a first shape and a second prism 110 feature having a second shape and the second shape is different than the first shape. The second prism feature 110 recovers light that transmits out of the first prism feature 112 and directs it out of the light emission surface 104 of the light guide 100. Refer to FIG. 2 regarding the specifics of the doublet light extraction features 111.

FIG. 7 is similar to the step-wedge light guide 100 of FIG. 6 except FIG. 7 has a conical tilt angle 90 of 10 degrees. Example 10 is a circular light guide having a step wedge shape configured according to FIG. 7. Example 11 is a circular light guide having a step wedge shape configured according to FIG. 7 however the conical tilt 90 is 20 degrees.

Figure 8:
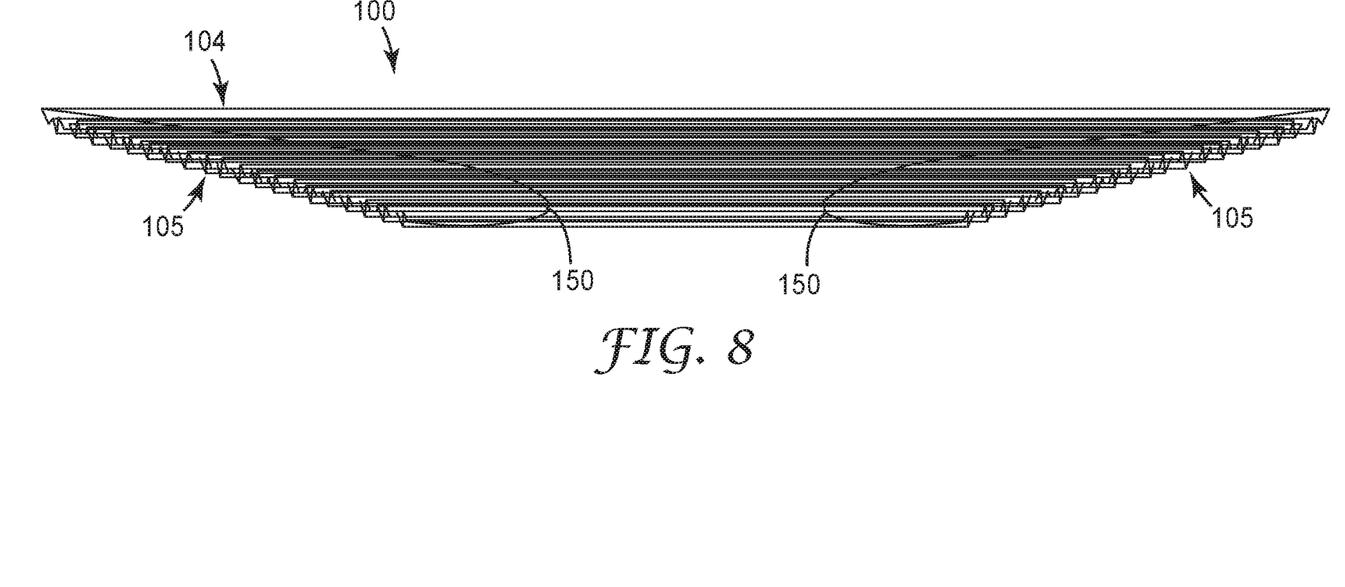
FIG. 8 is a side elevation schematic diagram view of the illustrative step-wedge light guide of FIG. 7.

FIG. 8 is a side elevation schematic diagram view of the illustrative step-wedge light guide 100 of FIG. 7. Light sources 150 are illustrated along an inner radius of the step-wedge light guide 100. FIG. 8 illustrated a bowl shaped light guide formed from the step-wedge light guide 100 of FIG. 7 the tilt angle 90, rotated about 360 degrees about a center axis 140.

Figure 9:
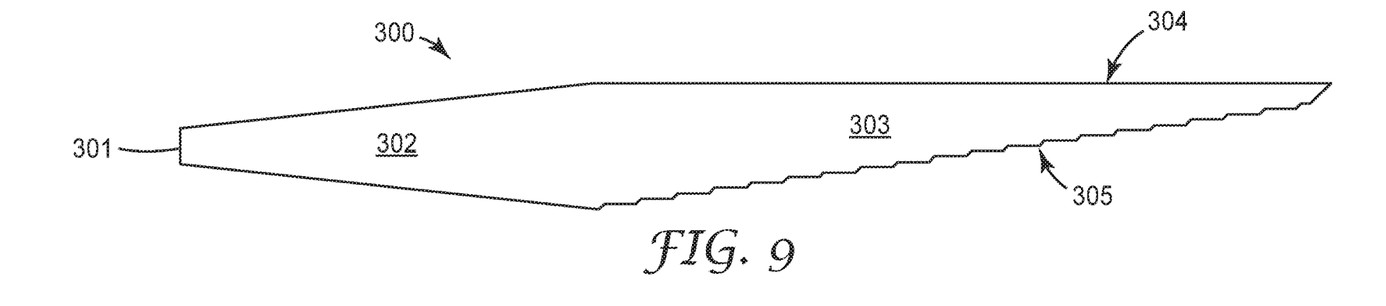
FIG. 9 is a cross-sectional schematic diagram of a comparative step-wedge light guide.
Figures 10, 11:
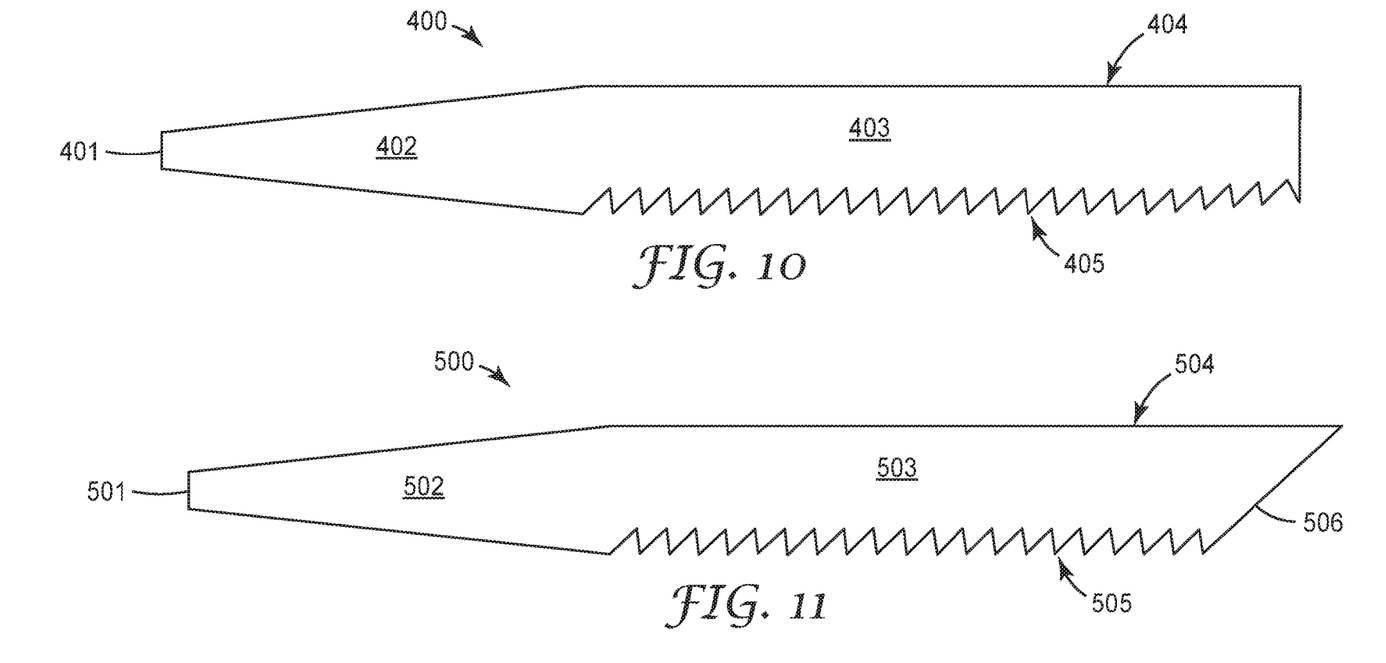
FIG. 10 is a cross-sectional schematic diagram of a comparative slab light guide.
FIG. 11 is a cross-sectional schematic diagram of another comparative slab light guide.

FIG. 9 is a cross-sectional schematic diagram of a comparative step-wedge light guide. FIG. 10 is a cross-sectional schematic diagram of a comparative slab light guide. FIG. 11 is a cross-sectional schematic diagram of another comparative slab light guide.

Figure 16:
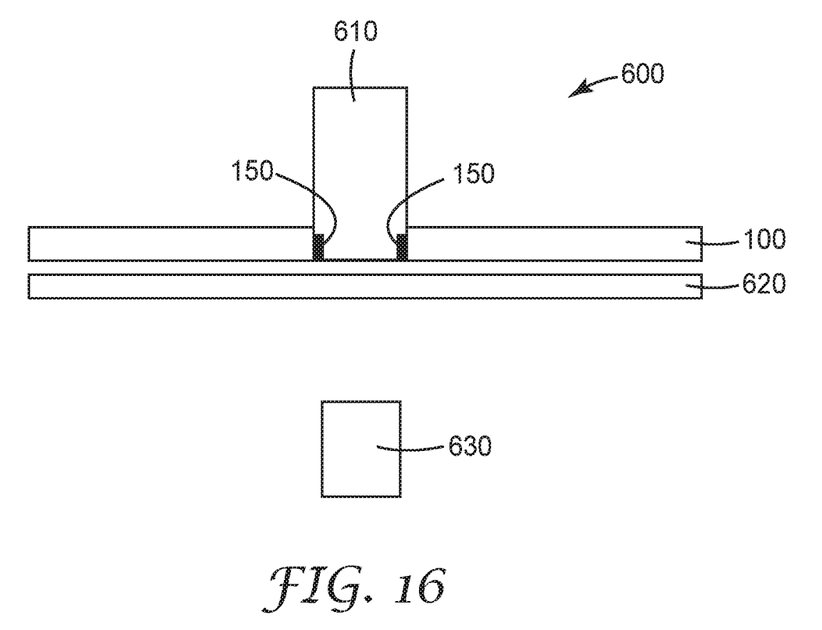
FIG. 16 is a schematic diagram of a luminaire and control system utilizing a light steering element.

FIG. 16 is a schematic diagram of a luminaire and control system 600 utilizing a light steering element 620. The luminaire and control system 600 can include a light guide 100 as described herein and a light steering element 620 adjacent to the light guide 100. A light source 150 heat sink and controller 610 can be fixed to or disposed within an inner radius of the annular light guide 100. As described above, a plurality of light sources 150 such as LEDs can be disposed about the inner radius of the annular light guide 100. Light sources 150 can be selectively illuminated as desired to provide a varied light emission through the light guide 100.

The light steering element 620 can modify the light emitted from the light guide 100. The light steering element 620 can redirect the light emitted from the light guide 100. The light steering element 620 can increase the full height half max (FWHM) in at least one direction of the light emitted from the light guide 100. The light steering element 620 can be spatially variant to steer light in different directions depending on which light sources 150 are illuminated. This can be described as "active light steering". In many embodiments, the light steering element 620 can be fixed relative to the light guide 100. In some embodiments the light steering element 620 can be movable or rotatable relative to the light guide 100.

The controller 610 can be operably connected to a sensor 630. The sensor 630 can sense light emitted from the light guide 100 or light steering element 620 and communication with the controller 610 to modify the light emitted from the light guide 100 or light steering element 620. The sensor 630 can be wired or wirelessly coupled to the controller 610.

Objects and advantages of this disclosure are further illustrated by the following examples, but the particular materials and amounts thereof recited in these examples, as well as other conditions and details, should not be construed to unduly limit this disclosure.

EXAMPLES

An outline of the collimation wedge and step-wedge light guide shown in FIG. 1 was constructed in an Excel Workbook and then inserted as a thin sheet into a TracePro model layout. (TracePro software is available from Lambda Research Corp., Littleton Mass.). The sheet was revolved 360 degrees around its symmetry axis (140 of FIG. 1), resulting in a 3D solid model. Dimensions (in mm) along the light guide are shown in FIG. 1. The wedge-light (100) consisted of a collimation wedge (102) and an extractor step-wedge (103). Features of the construction included the extractor doublets (111) shown in FIG. 2, maximum thickness (112), inner radius (113), wedge radius (114), outer radius (115), main extractor facet angle (120), second extractor facet angle (121), distal facet angle (122), riser facet angle, main extractor facet height (130), second extractor height (131), valley depth (132), and step height (133).

FIG. 3 shows the light guide 100 was housed in a thin hollow cylinder or can 200. The lid of the can functioned as a detector surface, essential only for the optical simulation. FIG. 3 shows the light guide with the reflector/detector cylinder 200 having detector surface 210, which is modeled as 100% absorbing, mirror surfaces (211 and 212), modeled as 95% reflective, the solid light guide 103, the LED ring 150 with 18 LEDs. The LEDs were modeled as emitting from a Lambertian grid-source 2 mm wide by 1.2, 1.5 or 1.75 mm tall between the light guide input edge and the reflective LED surface.

Examples 1-3

Figure 12:
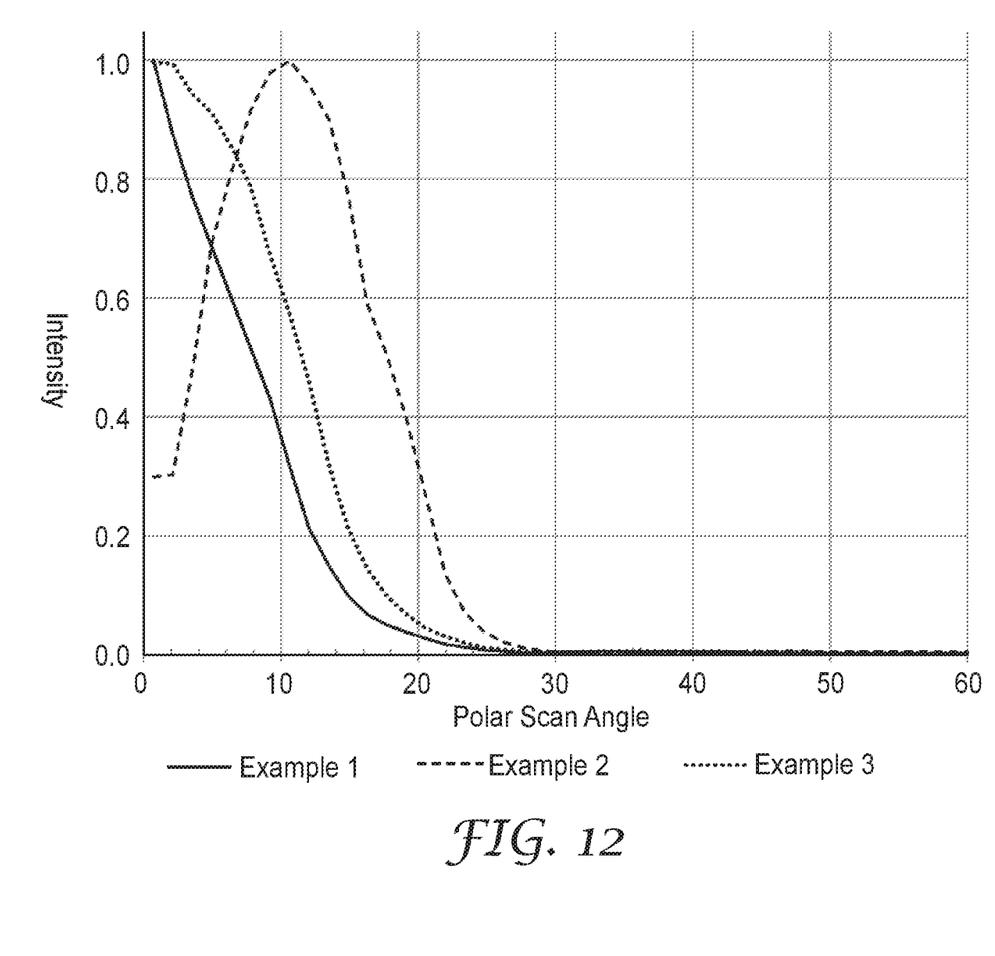
FIG. 12-15 are polar angle intensity graphs of the examples.

Examples 1, 2 and 3 varied the first and second extractor facet angle to explore their contribution to focusing light more or less tightly on axis (see FIG. 1 and FIG. 2). These and all other design parameters that were used are identified in Table 1A. FIG. 12 shows computed polar angle intensity scans for examples 1-3.

Example 4-7

Figure 13:
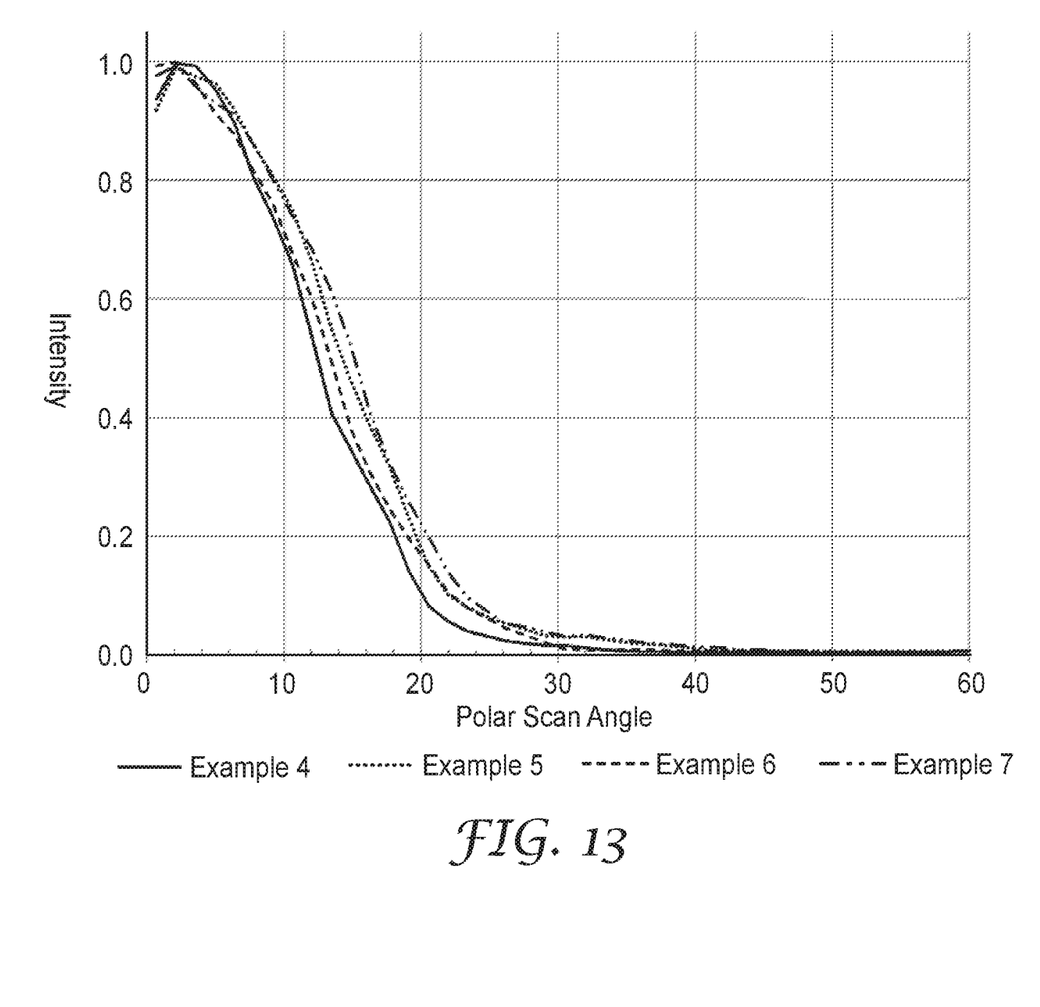

Examples 4, 5, 6 and 7 explored two maximum thicknesses, 8 and 6 mm, outer radii of 105, 90 and 75 mm, and first extractor facet angles of 41.5 and 41.75 degrees (see FIG. 1 and FIG. 2). Within this range of input parameters the full width at half maximum (FWHM) varied from 11 to 15 degrees. All design parameters used are identified in Table 1A. FIG. 13 shows computed polar angle intensity scans for examples 4-7.

Table 1A identifies design parameters for examples 1-7.

Figure 14:
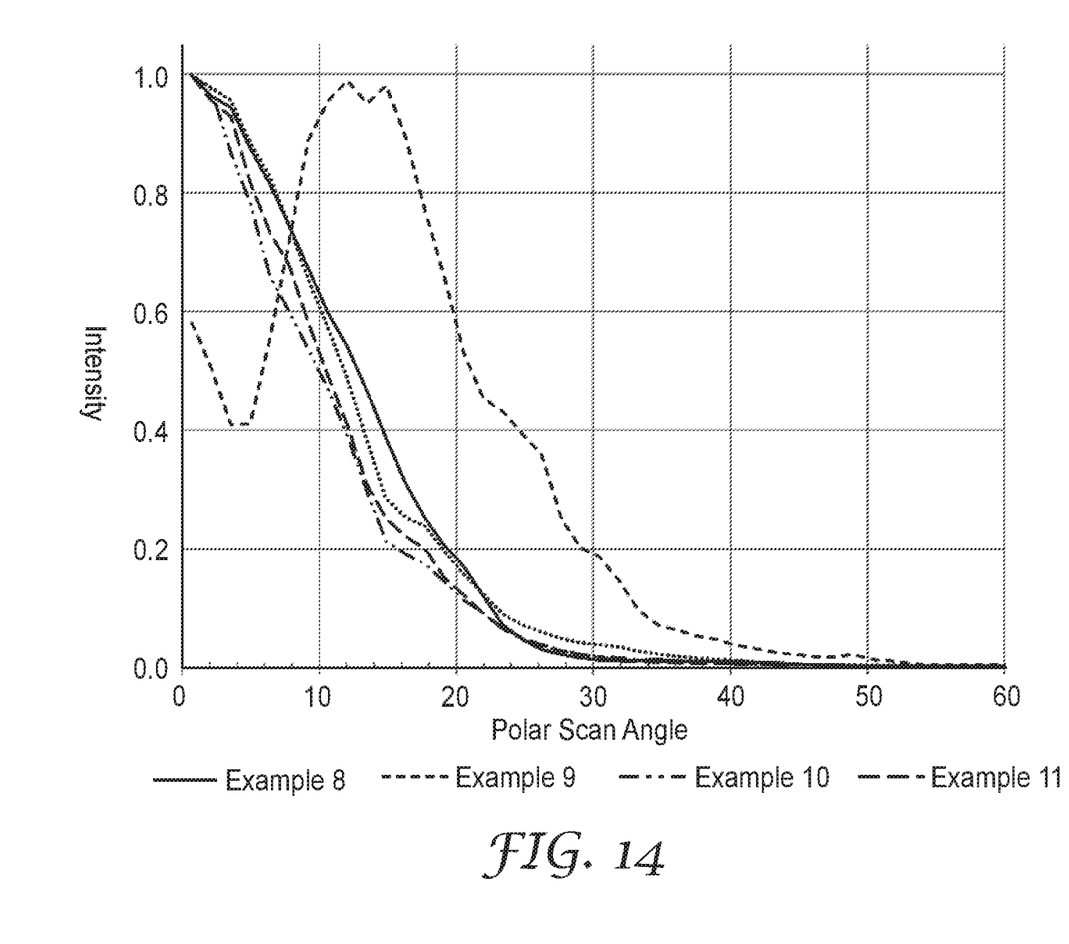

Example 8 replicated the configuration of Example 7 except that the refractive index of the wedge was 1.59 instead of 1.493. The polar intensity scan of example 8 is shown in FIG. 14.

Examples 9-11

These examples used the compound parabolic collimator shown in FIG. 6 and FIG. 7 instead of the wedge collimator. Example 9 was designed to emit into a ring peaked near 10 degrees. For Example 10, the light guide was tipped 10 degrees (so that the light guide formed a cone when revolved around the central axis), and the resulting emission peak was centered on-axis. Example 11 was designed to emit approximately 20 degrees off-axis, but the light guide was also tipped by 20 degrees, and the resulting emission peak was centered on-axis. The UGR metrics in Table 2B for Examples 10 and 11 show particularly low values (8.0 and 6.2, respectively). This suggested that balancing extractor facet angles and the light guide tilt angle could minimize high angle leakage and minimize UGR. The polar intensity scans of examples 9-11 are shown in FIG. 14.

Examples 12-14

Figure 15:
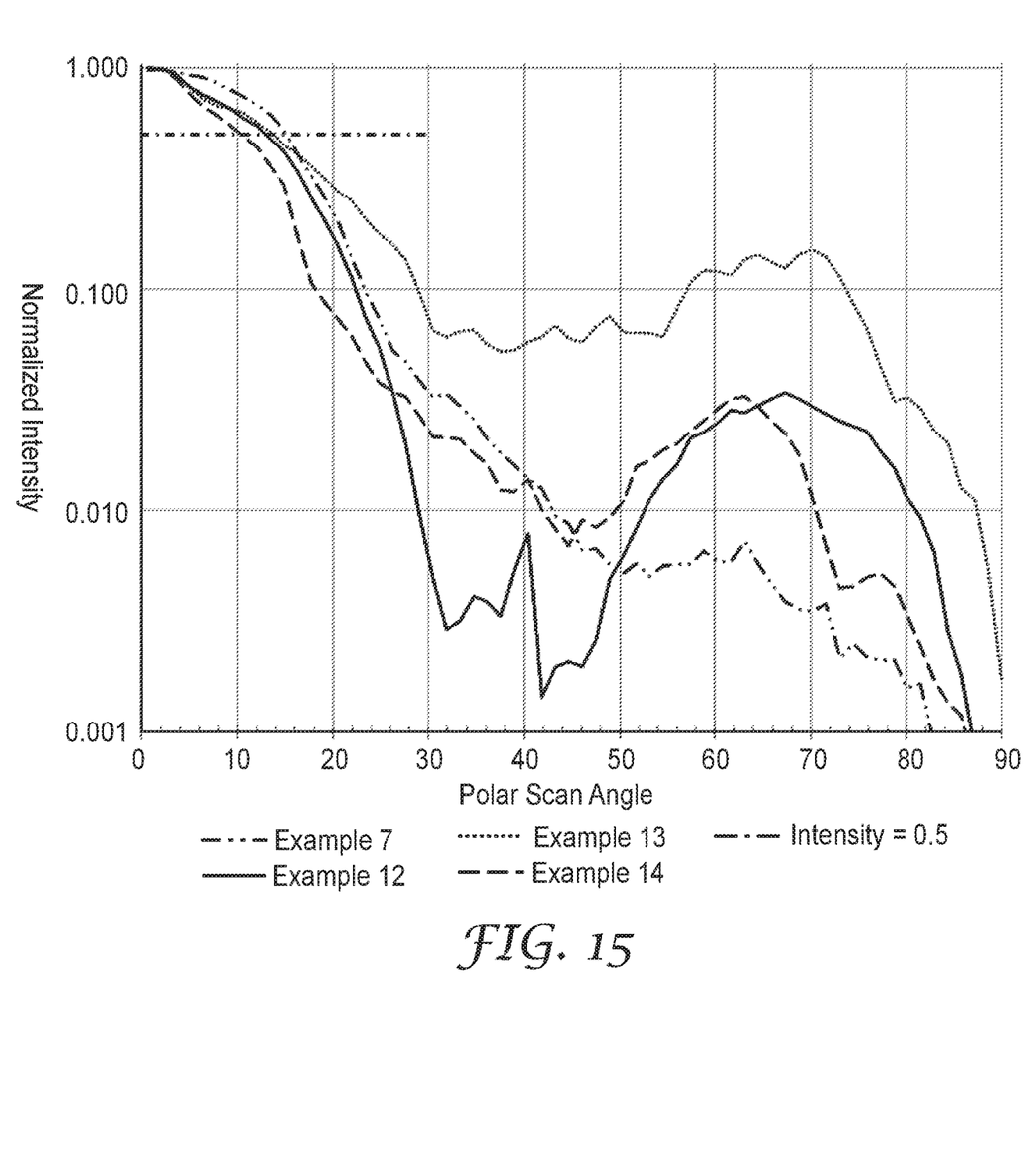

These examples are comparative examples where example 12 is shown in FIG. 9, example 13 is shown in FIG. 10 and example 14 is shown in FIG. 14. The polar intensity scans of these examples and example 7 are shown in FIG. 15.

| | Example # | | | | | | |
|---|---|---|---|---|---|---|---|
| | 1 | 2 | 3 | 4 | 5 | 6 | 7 |
| Number of extractor doublets | 20 | 20 | 20 | 20 | 20 | 20 | 20 |
| Max thickness (mm) | 8 | 8 | 8 | 8 | 8 | 6 | 6 |
| Inner radius (mm) | 25 | 25 | 25 | 20 | 20 | 20 | 20 |
| Collimating Wedge radius (mm) | 55 | 55 | 55 | 45 | 40 | 40 | 40 |
| Outer radius (mm) | 135 | 135 | 135 | 105 | 90 | 90 | 75 |
| First extractor facet angle (deg) | 43 | 40 | 42 | 41.5 | 41.5 | 41.75 | 41.75 |
| Second extractor facet angle (deg) | 48 | 45 | 47 | 46.5 | 46.5 | 46.75 | 46.75 |
| Riser facet angle (deg) | 82 | 82 | 82 | 82 | 82 | 82 | 82 |
| Distal facet angle (deg) | 45.5 | 42.5 | 44.5 | 44 | 44 | 44.25 | 44.25 |
| First extractor height (mm) | 0.75 | 0.75 | 0.75 | 0.75 | 0.75 | 0.54 | 0.54 |
| Second extractor height (mm) | 0.70 | 0.70 | 0.70 | 0.70 | 0.70 | 0.50 | 0.50 |
| Valley depth (mm) | −0.35 | −0.35 | −0.35 | −0.35 | −0.35 | −0.25 | −0.25 |
| Step height (mm) | 0.35 | 0.35 | 0.35 | 0.35 | 0.35 | 0.25 | 0.25 |
| Distal facet height (mm) | 1 | 1 | 1 | 1 | 1 | 1 | 1 |
| Conical tilt angel (deg) | 0 | 0 | 0 | 0 | 0 | 0 | 0 |
| Input wedge width (mm) | 2 | 2 | 2 | 2 | 2 | 2 | 1.5 |
| LED height (mm) | 1.75 | 1.75 | 1.75 | 1.75 | 1.75 | 1.75 | 1.2 |
| Injector edge height | 2 | 2 | 2 | 2 | 2 | 2 | 1.5 |
| LED emitter surface height (mm) | 1.75 | 1.75 | 1.75 | 1.75 | 1.75 | 1.75 | 1.2 |

Table 1B identifies design parameters for examples 8-14.

|  | Example # |  |  |  |  |  |  |
| --- | --- | --- | --- | --- | --- | --- | --- |
|  | 8 | 9 | 10 | 11 | 12 | 13 | 14 |
| Number of extractor doublets | 20 | 20 | 20 | 20 | 20 | 20 | 20 |
| Max thickness (mm) | 6 | 10 | 10 | 10 | 6 | 6 | 6 |
| Inner radius (mm) | 20 | 20 | 20 | 20 | 20 | 20 | 20 |
| Collimating Wedge radius (mm) | 40 | 40 | 40 | 40 | 40 | 40 | 40 |
| Outer radius (mm) | 75 | 100 | 100 | 100 | 75 | 75 | 75 |
| First extractor facet angle (deg) | 41.75 | 38 | 38 | 35 | 44.25 | 44.25 | 44.25 |
| Second extractor facet angle (deg) | 46.75 | 43 | 43 | 40 | NA | NA | NA |
| Riser facet angle (deg) | 82 | 82 | 82 | 82 | 82 | 82 | 82 |
| Distal facet angle (deg) | 44.25 | 40.5 | 40.5 | 37.5 | 44.25 | 90 | 44.25 |
| First extractor height (mm) | 0.54 | 0.96 | 0.96 | 0.91 | 0.54 | 1.2 | 1.2 |
| Second extractor height (mm) | 0.50 | 0.90 | 0.90 | 0.85 | NA | NA | NA |
| Valley depth (mm) | −0.25 | −0.45 | −0.45 | −0.43 | NA | NA | NA |
| Step height (mm) | 0.25 | 0.45 | 0.45 | 0.43 | 0.25 | 0.0 | 0.0 |
| Distal facet height (mm) | 1 | 1 | 1 | 1.5 | 1 | 6 | 6 |
| Conical tilt angel (deg) | 0 | 0 | 10 | 20 | 0 | 0 | 0 |
| Input wedge width (mm) | 1.5 | 1.7 | 1.7 | 1.7 | 1.5 | 1.5 | 1.5 |
| LED height (mm) | 1.2 | 1.5 | 1.5 | 1.5 | 1.2 | 1.2 | 1.2 |
| Injector edge height | 1.5 | 1.7 | 1.7 | 1.7 | 1.7 | 1.7 | 1.7 |
| LED emitter surface height (mm) | 1.2 | 1.5 | 1.5 | 1.5 | 1.5 | 1.5 | 1.5 |

A Unified Glare Rating (UGR) was also computed (TracePro UGR utility) for all examples. The calculation was tested against the UGR software resident on a RIGO goniometer and found to be in good agreement. Computed UGR values are shown in Table 2A and 2B for all examples. The computation assumed a nominal 2000 lumen source.

Table 2A identifies computed UGR values for examples 1-7.

|  | Example # |  |  |  |  |  |  |
| --- | --- | --- | --- | --- | --- | --- | --- |
|  | 1 | 2 | 3 | 4 | 5 | 6 | 7 |
| Output power (lumen) | 1922 | 1921 | 1923 | 1922 | 1922 | 1917 | 1917 |
| Output efficiency | 96% | 96% | 96% | 96% | 96% | 96% | 96% |
| UGR (8H:12H:70:50:20) | 15.7 | 8.3 | 13.7 | 13.7 | 12.9 | 16.0 | 13.0 |

Table 1B identifies identifies computed UGR values for examples 8-14.

|  | Example # |  |  |  |  |  |  |
| --- | --- | --- | --- | --- | --- | --- | --- |
|  | 8 | 9 | 10 | 11 | 12 | 13 | 14 |
| Output power (lumen) | 1905 | 1923 | 1911 | 1922 | 1884 | 1661 | 1861 |
| Output efficiency | 95% | 96% | 96% | 96% | 94% | 83% | 93% |
| UGR (8H:12H:70:50:20) | 12.0 | 9.5 | 8.0 | 6.2 | 26.4 | 29.2 | 22.7 |

Thus, embodiments of COLLIMATING STEP-WEDGE LIGHT GUIDE are disclosed.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof. The disclosed embodiments are presented for purposes of illustration and not limitation.

What is claimed is:

1. A light guide comprising:
    a light input surface;
    a first major surface orthogonal to the light input surface;
    a second major surface opposing the first major surface and forming a converging wedge with the first major surface, and comprising a plurality of doublet light extraction features separated by a land feature, each doublet feature comprising a first prism feature having a first shape and a second prism feature having a second shape and the second shape is different than the first shape;
    wherein the light guide forms at least a portion of a circle having an inner radius and an outer radius and the light input surface is located at the inner radius and the plurality of doublet light extraction features separated by the land feature are concentric.

2. The light guide according to claim 1, wherein the land feature is parallel with the first major surface.

3. The light guide according to claim 1, further comprising a light collimating diverging wedge between the light input surface and the second major surface.

4. The light guide according to claim 1, further comprising a light emitting diode transmitting Lambertian light into the light input surface.

5. The light guide according to claim 1, wherein the first major surface comprises light extraction features and directs light out of the second major surface.

6. The light guide according to claim 1, wherein the extraction features form at least a portion of a circle having an inner radius and an outer radius and the light input surface is located at the inner radius and the plurality of doublet light extraction features separated by the land feature are concentric.

7. The light guide according to claim 1, wherein the extraction features form a circle having an inner radius and an outer radius and the light input surface is located at the inner radius and the plurality of doublet light extraction features separated by the land feature are concentric.

8. The light guide according to claim 1, wherein a first arc portion of the light guide directs light in a first direction and a second arc portion of the light guide directs light in second direction that is different than the first direction.

9. The light guide according to claim 1, wherein the first major surface is curved or has a tilt angle of at least 10 degrees and forms a bowl shaped light guide.

10. The light guide according to claim 1, wherein light emitted from the light guide has a full width half max of less than 40 degrees or less than 30 degrees or less than 20 degrees.

11. The light guide according to claim 1, further comprising a light steering element receiving light emitted from the light guide, the light steering element modifying the emitted from the light guide and wherein the light steering element can optionally be spatially variant.

12. The light guide according to claim 1, further comprising a sensor operably coupled to a controller that operates the light source of the light guide.

13. A light guide comprising:
a light input surface;
a first major surface orthogonal to the light input surface;
a second major surface opposing the first major surface and forming a converging wedge with the first major surface, and comprising a plurality of doublet light extraction features separated by a land feature, each doublet feature comprising a first prism feature having a first shape and a second prism feature having a second shape and the second shape is different than the first shape;
wherein the extraction features form at least a portion of a circle having an inner radius and an outer radius and the light input surface is located at the inner radius and the plurality of doublet light extraction features separated by the land feature are concentric.

14. The light guide according to claim 13, wherein the land feature is parallel with the first major surface.

15. The light guide according to claim 13, further comprising a light collimating diverging wedge between the light input surface and the second major surface.

16. The light guide according to claim 13, further comprising a light emitting diode transmitting Lambertian light into the light input surface.

17. The light guide according to claim 13, wherein the first major surface comprises light extraction features and directs light out of the second major surface.

18. The light guide according to claim 13, wherein the extraction features form a circle having an inner radius and an outer radius and the light input surface is located at the inner radius and the plurality of doublet light extraction features separated by the land feature are concentric.

19. The light guide according to claim 13, wherein a first arc portion of the light guide directs light in a first direction and a second arc portion of the light guide directs light in second direction that is different than the first direction.

20. The light guide according to claim 13, wherein the first major surface is curved or has a tilt angle of at least 10 degrees and forms a bowl shaped light guide.

21. The light guide according to claim 13, wherein light emitted from the light guide has a full width half max of less than 40 degrees or less than 30 degrees or less than 20 degrees.

22. The light guide according to claim 13, further comprising a light steering element receiving light emitted from the light guide, the light steering element modifying the emitted from the light guide and wherein the light steering element can optionally be spatially variant.

23. The light guide according to claim 13, further comprising a sensor operably coupled to a controller that operates the light source of the light guide.

* * * * *